United States Patent [19]

Petterson

[11] 3,751,151

[45] Aug. 7, 1973

[54] AUDIO VISUAL DISPLAY APPARATUS

[75] Inventor: Tor H. Petterson, San Pedro, Calif.

[73] Assignee: Hoffman Electronics Corporation, El Monte, Calif.

[22] Filed: Mar. 1, 1971

[21] Appl. No.: 119,790

Related U.S. Application Data

[63] Continuation-in-part of Ser. No. 859,044, Sept. 18, 1969, abandoned, which is a continuation-in-part of Ser. No. 821,579, May 5, 1969.

[52] U.S. Cl. .................. 353/19, 353/120, 274/1 F, 274/13 A, 74/206

[51] Int. Cl. .................. G03b 31/06

[58] Field of Search .................. 274/1 F, 13 A; 353/120, 15, 19; 74/202, 206, 194

[56] References Cited

UNITED STATES PATENTS

| | | | |
|---|---|---|---|
| 2,810,581 | 10/1957 | Bergne | 274/13 A |
| 3,245,312 | 4/1966 | Paull | 353/19 |
| 1,862,800 | 6/1932 | Otten | 274/13 A |

FOREIGN PATENTS OR APPLICATIONS

| | | | |
|---|---|---|---|
| 206,472 | 11/1939 | Switzerland | 274/13 A |

*Primary Examiner*—Harry N. Haroian
*Attorney*—Lyon & Lyon

[57] ABSTRACT

An audio and visual display apparatus which utilizes a cartridge having one or more picture transparencies surrounded by a rotatable recording disc including a drive track on one side and a sound track on the opposite side, the cartridge being insertable in a projector with the transparency in alignment with the optical axis of the projector. A drive wheel engages the drive track at three spaced points to maintain a predetermined azimuth relation between the sound track and the sensing element of a cooperating sound pickup unit. The rotatable recording disc of one embodiment having a mounting means so arranged as to permit translatory movement as well as rotary movement with respect to the transparency.

8 Claims, 20 Drawing Figures

INVENTOR.
TOR H. PETTERSON

BY

Lyon & Lyon
ATTORNEYS

INVENTOR.
TOR H. PETTERSON

BY Lyon & Lyon

ATTORNEYS

INVENTOR.
TOR H. PETTERSON
BY Lyon & Lyon
ATTORNEYS

INVENTOR.
TOR H. PETTERSON
BY
Lyon & Lyon
ATTORNEYS

INVENTOR.
TOR H. PETTERSON
BY
Lyon & Lyon
ATTORNEYS

AUDIO VISUAL DISPLAY APPARATUS

This application is a Continuation-In-Part of the following copending application:

AUDIO VISUAL DISPLAY APPARATUS
Ser. No. 859,044
Filed Sept. 18, 1969, now abandoned said copending application being a Continuation-In-Part of the following application copending therewith but now abandoned:

AUDIO VISUAL DISPLAY APPARATUS
Ser. No. 821,579
Filed May 5, 1969.

BACKGROUND OF THE INVENTION

Slide projectors, unlike moving picture projectors, are not readily adapted for the production of sound while the picture is being shown. Attempts have been made to incorporate in a cartridge a transparency and a sound record. In some cases the record has been mounted at one side of the transparency and in other cases concentric therewith; also, in the prior art the record has been mounted for rotation or has been fixed, and the cartridge has been arranged for placement in a horizontal or a vertical position. Whether the record is horizontally or vertically mounted, tracking of the sound track has been difficult to attain and has required expensive and cumbersome sound reproducing apparatus.

SUMMARY OF THE INVENTION

The present invention is directed to a simplified an an improved audio visual display apparatus wherein the problems inherent in prior apparatus of this type are eliminated or minimized, the invention being summarized in the following objects:

First, to provide an audio visual apparatus which utilizes a novel cartridge having a photographic transparency surrounded by a rotatable disc having a spiral sound track and a spiral drive channel engageable by a drive wheel.

Second, to provide an apparatus, a indicated in the preceding object, wherein the sound track of the rotatable disc may be arranged with a magnetic surface for magnetic pickup or an undulating surface for mechanical pickup.

Third, to provide a novel audio reproducing disc having a drive groove on one side and a magnetic sound track on the opposite side and a novelly cooperating drive wheel and magnetic pickup head, wherein the drive wheel and drive groove are so related that the drive wheel engages the walls of the drive groove at three spaced points so that the magnetic pickup head is maintained in predetermined azimuth relation to the sound track, thus minimizing sound distortion while permitting a slower track speed.

Fourth, to provide an embodiment of the apparatus, indicated in the preceding objects, wherein the sound disc may be arranged for translator movement as well as rotary movement so that the drive wheel may rotate without translatory movement, and the pickup may be fixed, thereby materially simplifying the apparatus which receives the cartridge.

Fifth, to provide an embodiment of the cartridge wherein the record disc is provided with a novel dual magnetic sound track that may be used for stereo reproduction or consecutive use.

Sixth, to provide an embodiment of the cartridge wherein a transparency holder forms a hub for the record disc and is provided with novel catch means cooperating with a catch mechanism carried by the projector whereby, when the cartridge is placed in the projector, the transparency automatically rotates into viewing position and then remains fixed.

Figures 1, 2, 4:
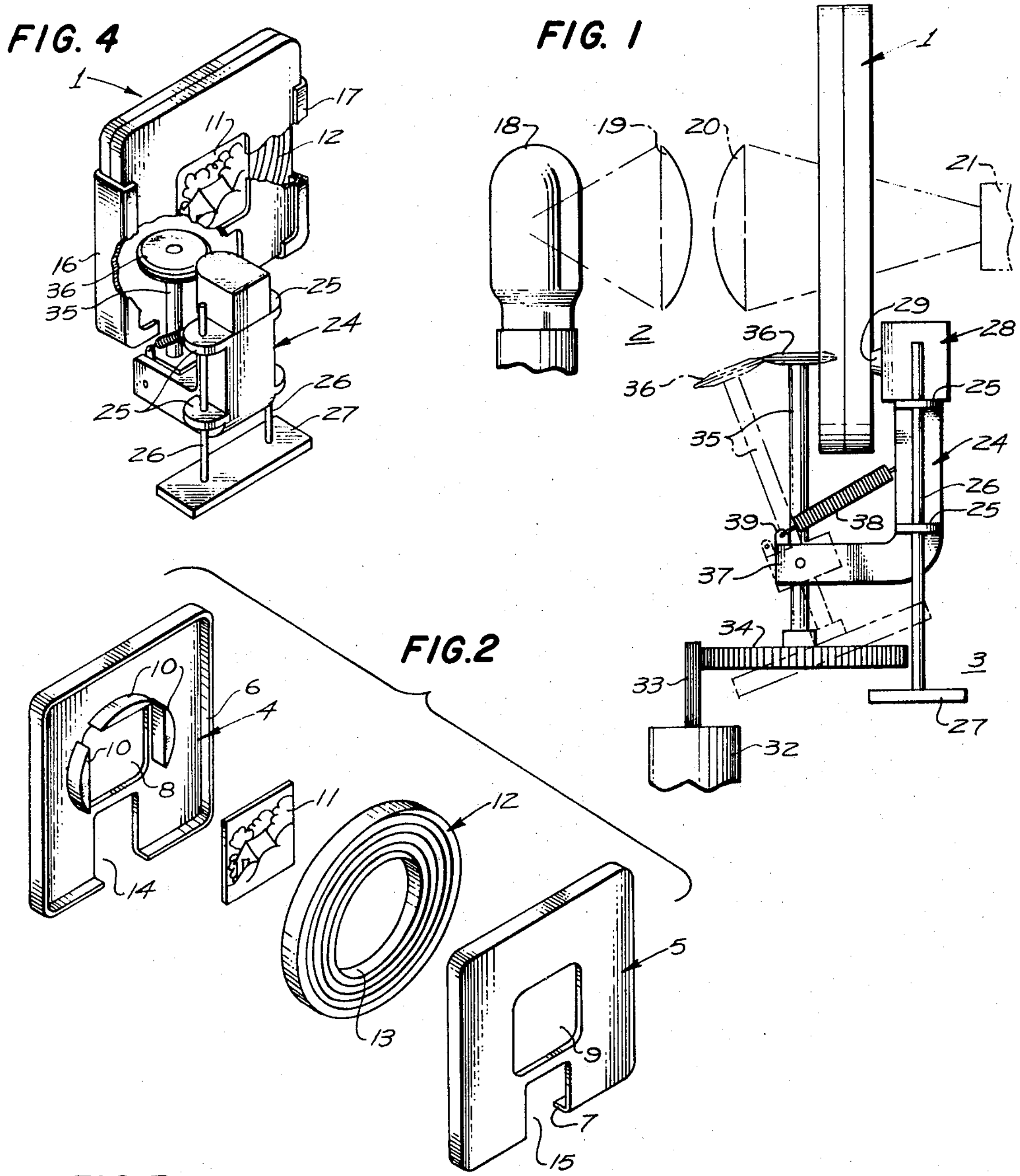
FIG. 1 is a fragmentary side elevation view of a cartridge and drive mechanism representing one embodiment of the present invention.
FIG. 2 is an exploded view of the cartridge assembly shown in FIG. 1.
FIG. 4 is a perspective view of the cartridge and drive assembly of FIG. 1.

Reference is first directed to FIGS. 1 through 4, showing an embodiment of the audio visual display apparatus. The apparatus includes a replaceable slide and sound record cartridge 1, shown in operative position in relation to an optical projection system, indicated generally at 2, and a record transport assembly, indicated generally at 3. The cartridge assembly 1, as best seen in FIG. 2, includes two enclosing members 4 and 5 which may be made of molded plastic or other suitable material. Both enclosing members are formed with a lip or ridge 6 and 7, respectively, around the margins thereof. These lips abut each other in assembled position and are welded or glued together to form an integral enclosing structure.

Both enclosing members are provided with substantially square or rectangular openings 8 and 9, respectively, which are aligned to form a window through the cartridge assembly. The enclosing member 4 is formed with journal segments 10 positioned adjacent three sides of the opening 8. The inner margins of the journal segments 10 are flat and positioned relative to each other to grip three edges of the photographic transparency 11. The outer margins of the three journal segments 10 define a substantially cylindrical surface having an axis of revolution extending through the center of the opening 8.

An audio disc 12 has a central opening 13 dimensioned to rotate on the journal segments 10 when the cartridge unit is assembled. The enclosing members 4 and 5 are provided with cutout portions along the lower margins 14 and 15, respectively, which expose the surfaces of the disc 12 to the record transport assembly 3. As seen in FIGS. 1 and 4, the cartridge unit 1 fits between a pair of suitable supporting brackets 16 and 17 which are part of the projector frame assembly (not shown). When inserted, the cartridge is positioned with the center of the openings 8 and 9 and the transparency 11 positioned along the optical axis of the optical projection system 2. The projection system is conventional in form and includes a light source 18, condensing lenses 19 and 20, and a projection lens 21.

Figure 3:
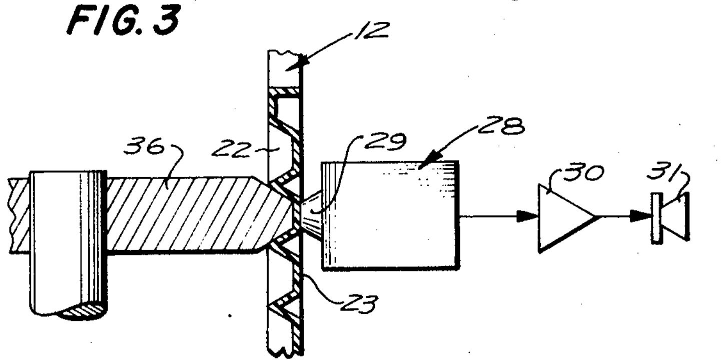
FIG. 3 is an enlarged partial sectional view, partial diagrammatical view of a portion of the record member and the associated drive wheel and transducer.

As best seen in FIG. 3, the audio disc 12 is molded or otherwise formed with a spiral groove or channel 22. The face of the audio disc opposite the channel forms a spiral flat portion which is provided with a magnetic oxide layer 23 of a composition commonly used with magnetic recordings.

The record transport assembly 3 for the audio disc 12, as shown in FIGS. 1 and 4, includes a bracket member 24 having a pair of lugs 25 on both sides through which pass a pair of stationary guide rods 26. The guide rods are secured to and project upwardly through a support plate 27 which is part of the frame assembly of the projector. Thus, the bracket member 24 is securely supported for vertical movement relative to the cartridge 1. A magnetic playback head, indicated generally at 28, is mounted at the upper end of the bracket member 24 and is provided with pole tips 29 which project toward the surface of the audio disc when in operative position. The opening 15 in the enclosing member 5 permits the projecting pole tips 29 to occupy their operative position relative to the magnetic recording surface of the disc, as best shown in FIG. 3. The playback head 28 is electrically connected through a suitable playback amplifier 30 to drive a loud speaker 31.

Rotation of the audio disc is derived from a drive motor 32 through a drive train which includes a pinion 33 on the end of the shaft of the motor 32 and a frictional or geared drive wheel 34 which normally engages the pinion 33. The drive wheel is carried by a drive shaft 35, which also carries a final drive wheel 36 adapted to engage the surface of the audio disc 12. As shown in FIG. 3, the final drive wheel 36 has a chamfered periphery which fits snugly into the channel 22. The shaft 35 is journaled in a bearing member 37, which is pivotally supported from the bracket member 24. A tension spring 38 has one end connected to a lug 39 which is integral with the bearing member 37. The other end of the spring 38 is secured to the bracket member 24. Thus, the spring 38 normally urges the bearing member 37 and shaft 35 to move the final drive wheel 36 into pressing contact with the surface of the audio disc 12. At the same time, the drive member 34 is pressed into driven contact with the pinion 33. The pivoting arrangement of the bearing 37 permits the drive wheel 36 to be moved away from the surface of the audio disc 12, allowing the cartridge 1 to be readily removed and replaced with another cartridge.

Due to a wedging action between the wheel 36 and the tapered sides of the channel 22, a dependable drive connection is established without excessive side force on the audio disc 12, so that the pole tips riging on the smooth surface of the sound track resist such force without appreciable friction.

Operation of the embodiment of the audio visual display apparatus shown in FIGS. 1 through 4 is as follows:

The record transport assembly normally occupies its lower position, as indicated by solid lines in FIG. 1. However, if desired, the assembly may be spring supported in a normally upper position. In either case, the final drive wheel 36 is tilted free of the cartridge 1 and the wheel 34 is clear of the pinion 33. The cartridge is inserted in the guides 17 to place the pole tips opposite the sound track 23. Then by means, not shown, the drive wheel 36 is tilted into engagement with the channel 22 and the wheel 34 into engagement with the pinion 33.

Rotation of the drive wheel lifts the transport assembly relative to the audio disc 12. The weight of the assembly may be counterbalanced to minimize the load on the drive wheel 36. It should be noted that the movement of the sound track past the pole tips 29 is constant.

Figure 5:
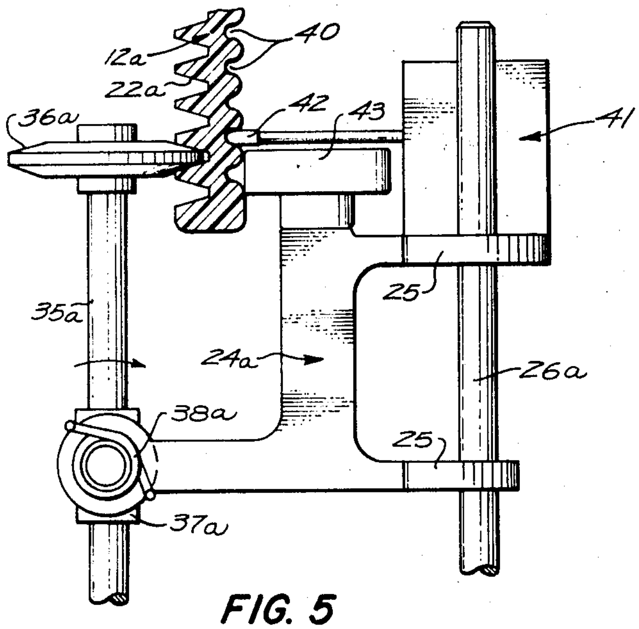
FIG. 5 is an enlarged fragmentary sectional view, similar to FIG. 1, of a modified record disc adapted for mechanical pickup and the combined drive means and pickup head therefor.

Reference is now directed to FIG. 5 of the drawings, which is a view similar to FIG. 1, in which a modified audio disc 12*a* is employed. The audio disc 12*a* is provided as in the first described structure with a spiral drive channel 22*a*. However, in place of the oxide layer or sound track of the first described structure, there is provided a spiral groove 40 forming a mechanical sound track.

As in the first described structure, there is provided a bracket member 24*a*, having lugs 25*a* which receive a pair of guide rods 26*a*. The bracket member 24*a* supports a bearing member 36*a* which journals a drive shaft 35*a*, at the upper end of which is mounted a final drive wheel 36*a*. The bearing member 37*a* is capable of pivotal movement to move the drive wheel 36*a* to and from the audio disc. In the construction shown in FIG. 5, a spiral spring 38*a* tends to hold the drive wheel 36*a* in drive connection with the channel 22*a*.

The bracket member 24*a* supports a transducer 41, having a needle 42 which engages the sound track 40. One or more back pressure wheels 43 resist the load on the audio disc 12*a* caused by the drive wheel 36*a*.

Figure 6:
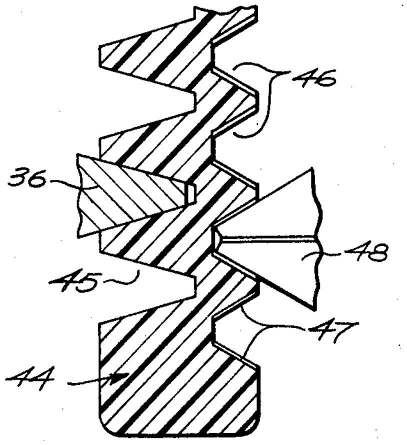
FIG. 6 is another enlarged fragmentary sectional view, showing a further modified record disc adapted for magnetic stereo pickup.

Reference is now directed to FIG. 6, which illustrates an audio disc 44, having a spiral drive channel 45 similar to the previously described drive channels. Its opposite side is provided with a spiral sound track channel 46, having converging side walls on which are provided appropriate ferrous oxide coatings to form a pair of opposed sound tracks 47. These sound tracks may carry stereo recordings or may be arranged to operate in sequence, in the latter case to increase the playing time of the record. A dual pickup head 48 fits in the channel 46 for cooperation with thw two sound tracks 47.

Figure 7:
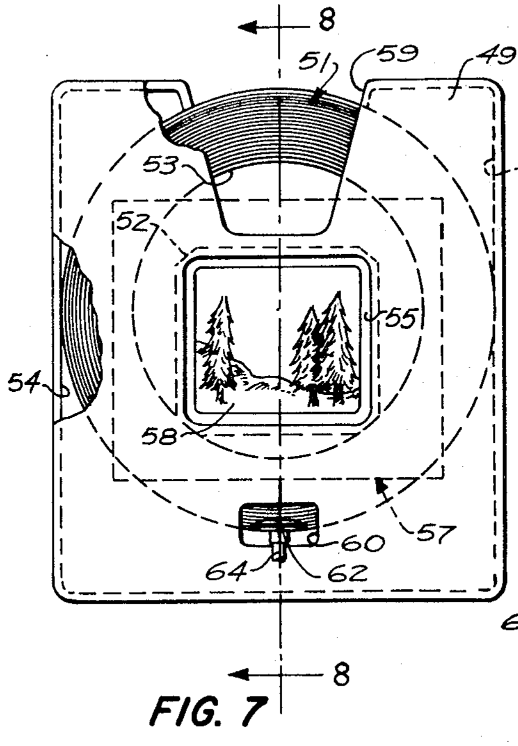
FIG. 7 is an elevational view of a modified form of cartridge, wherein the record disc is capable of both rotational and translatory movement, showing the record disc in its finishing position.
Figure 8:
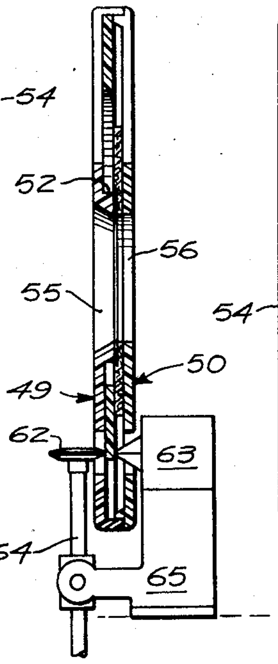
FIG. 8 s a sectional view, taken through 8—8 of FIG. 7.
Figure 9:
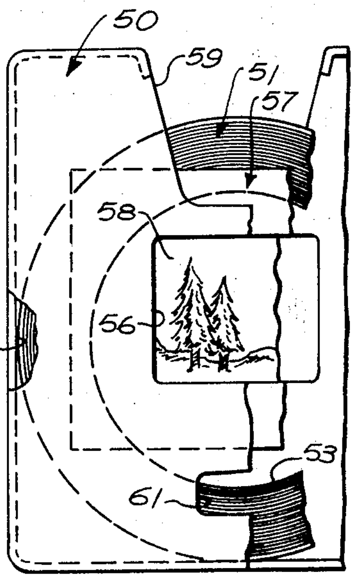
FIG. 9 is a fragmentary elevational view, showing the opposite side of the cartridge with the record disc in its starting position.

Reference is now directed to FIGS. 7, 8 and 9. In this construction, the cartridge includes a case 49, which may be rectangular, and receives a cover 50 to form a chamber which receives an audio disc 51, which may be similar to any of the previously described audio discs. The case is provided with a central boss 52, and the audio disc 51 is provided with a central opening 53, so dimensioned that the audio disc is capable of predetermined translation movement within the case 49, and is restrined against laterdisplacement by opposed guide walls 54.

The central boss 52 of the case 49, and the cover 50 are provided with transparency exposure openings 55 and 56, respectively. A transparency mounting card 57 is interposed between the cover 50 and the boss 52 and is provided with a central opening which receives a transparency 58. Alternatively, the transparency may be fastened directly to the cover 50. In either case, the transparency is fixed in position.

The case 49 and cover 50 are provided with similar upper access slots 59 which expose the audio disc 51 to permit the disc to be raised ith respect to the case 49. Also, the case 49 and cover 50 are provided with bottom access slots 60 and 61, exposing the lower portion of the audio disc so that one side of the audio disc may be engaged by a final drive wheel 62, and the other side by a pickup head 63 appropriate to the sound track provided in the audio disc. The drive wheel 62 is mounted on a shaft 64 which is tiltable as previously described; however, in place of a bracket designed for translation movement, a fixed bracelet 65 is provided.

Operation of the cartridge shown in FIGS. 7, 8 and 9 is as follows:

When the cartridge is placed in an appropriate projector, the audio disc 51 is lifted to its raised position and the drive wheel 62 and pickup head 63 are brought into operative relation to the lower margin of the audio disc. On rotation of the drive wheel 62, the audio disc undergoes a rotary movement as well as a trnaslation movement as the disc 51 is guided downward between the walls 54. If desired, the audio disc may be initially engaged at the radially inner end of the drive track and raised by the drive wheel. Then, on completion of the sound sequence, the drive wheel may be automatically moved to clear to permit the disc to drop to its starting position.

By reason of the fact that the bracket 65 is fixed, the entire assembly involving the drive wheel 62 and pickup head 63 is materially simplified.

Reference is now directed to FIGS. 10 through 15. This construction utilizes a cartridge 66 in which the enclosures 4 and 5 are omitted. The cartridge 66 includes a transparency holder 67, having a central opening 68 which may be arranged to receive a transparency in either of two positions. The periphery of the holder 67 forms a journal rim 69 which fits within the central opening of a record disc 70, which may be identical to any of the record discs 12, 44 or 51, previously described. The radially inner margin of the record disc 70 is reduced in width and the transparency holder 67 is provided with retainer tabs 71 which are received in the reduced margins of the record disc so that the thickness of the transparency holder 67 and the record disc may be essentially the same to aid in stacking or handling the cartridge.

At or near its periphery, the transparency holder is provided with a pair of diametrically disposed catch slots 72 and 73, defining portions of concentric paths adjacent the outer margin of the transparency holder. The catch slots are provided with beveled margins 74 and are adapted to cooperate with catch pins as will be described hereinafter.

The embodiment of the invention shown in FIGS. 10 through 15 may utilize the bracket member 24 and related parts of the construction shown in FIGS. 1 and 4. More particularly the bracket member 24 is provided with slide lugs 25 which receive guide rods 26. The bracket member supports a pickup or playback head 28, or the pickup heads 41 or 48 may be substituted. The shaft 35 is preferably received in a bearing member 37*a*, similar to the bearing member 37, but elongated. The shaft 35 carries a drive wheel 36, similar to the constructions shown in the previous figures, and for convenience of illustration, a spring 38*a*, similar to that shown in FIG. 5, is utilized to urge the drive wheel 36 against the spiral drive channel 22 in the manner previously described.

Mounted in the projector which receives the cartridge, at the same side as is engaged by the drive wheel 36, is a fixed bracket 75 which carries a horizontally disposed slide member 76, having upwardly directed arms 77, the extremities of which are provided with slide bearings 78, which receive catch pins 79 backed by springs 80.

The catch pins 79 are positioned for cooperation with the catch slots 72 and 73. The slide member 76 is capable of slight movement to and from the side of the cartridge 66, this movement being effected by a shifting rod 81, carried by the bearing member 37a which journals the shaft 35 and drive wheel 36.

Figures 10, 11:
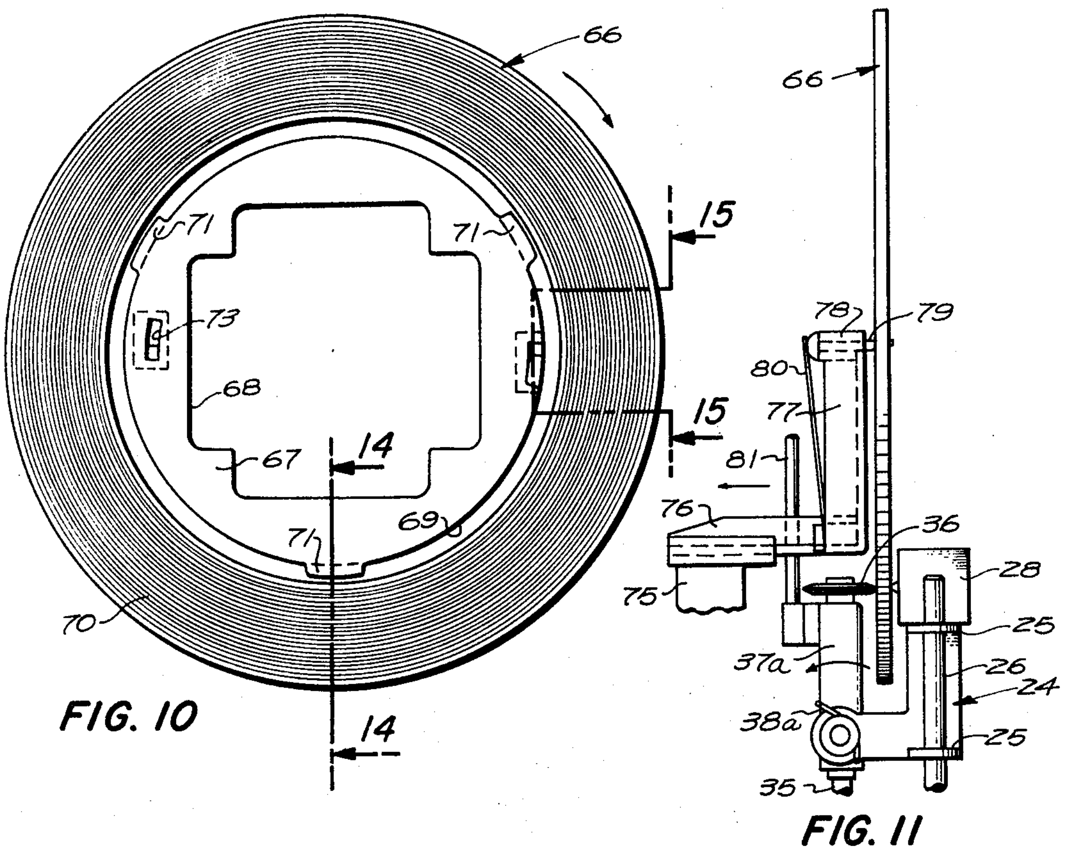
FIG. 10 is a side view of a further embodiment of the cartridge.
FIG. 11 is an edge view therof, showing fragmentarily the holding, driving and pickup mechanisms therefor in their operating positions.
Figures 12, 13, 14, 15:
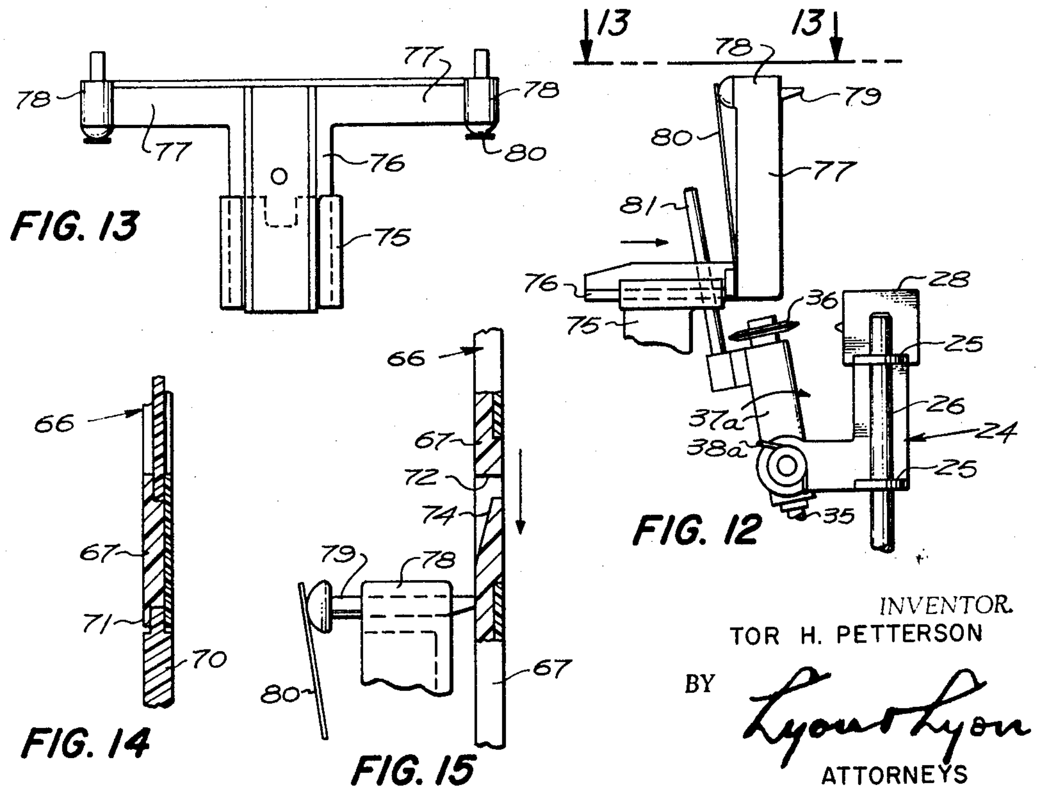
FIG. 12 is a similar fragmentary view of the holding, driving and pickup mechanisms in their open or cartridge receiving positions.
FIG. 13 is a plan view of the holding mechanism, taken from 13—13 of FIG. 12.
FIG. 14 is an enlarged fragmentary sectional view, taken through 14—14 of FIG. 10.
FIG. 15 is an enlarged fragmentary partial sectional, partial edge view, taken through 15—15 of FIG. 10.

Operation of the construction shown in FIGS. 10 through 15 is as follows:

As in the previous embodiments, but particularyly that shown in FIGS. 1 through 4, the drive wheel 36 moves between a cartridge clearing position, shown in FIG. 12, and a cartridge engaging position, shown in FIG. 11. This movemtnt is utilized through the shifting rod 81 to move the catch pins 79 between a clearing position, shown in FIG. 12, and an engaging position, shown in FIG. 11.

The cartridge is inserted when the drive wheel 36 and catch pin 79 are in the position shown in FIG. 12. Once the cartridge is in position, the drive wheel 36 is brought into contact with the spiral drive channel previously described, and in doing so, the catch pins 79 are brought into contact with the transparency holder 67. The contact pressure is light enough that the transparency holder tends to rotate with the record disc until the catch pins 79 engage in the catch slots 72 and 73. The catch slots are so oriented that the transparency is brought into the proper position for viewing when engaged by the catch pins. While two slots and two catch pins are shown, a single slot and catch pin may be used.

It should be noted that the cartridge is guided into place by suitable guide means, not shown, provided in the projector.

Figure 16:
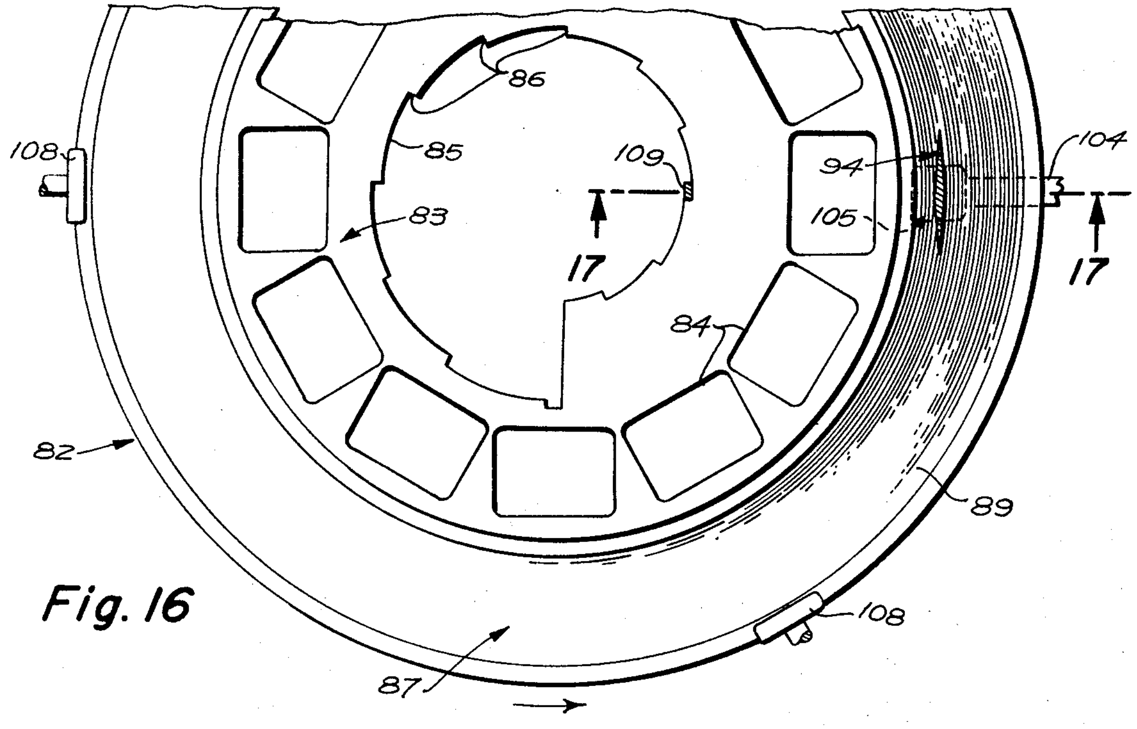
FIG. 16 is a fragmentary bottom view of an embodiment of the audio visual cartridge adapted for a plurality of transparencies with the drive wheel and retainer finger shown in section, the section being taken through 16113 16 of FIG. 17.
Figure 17:
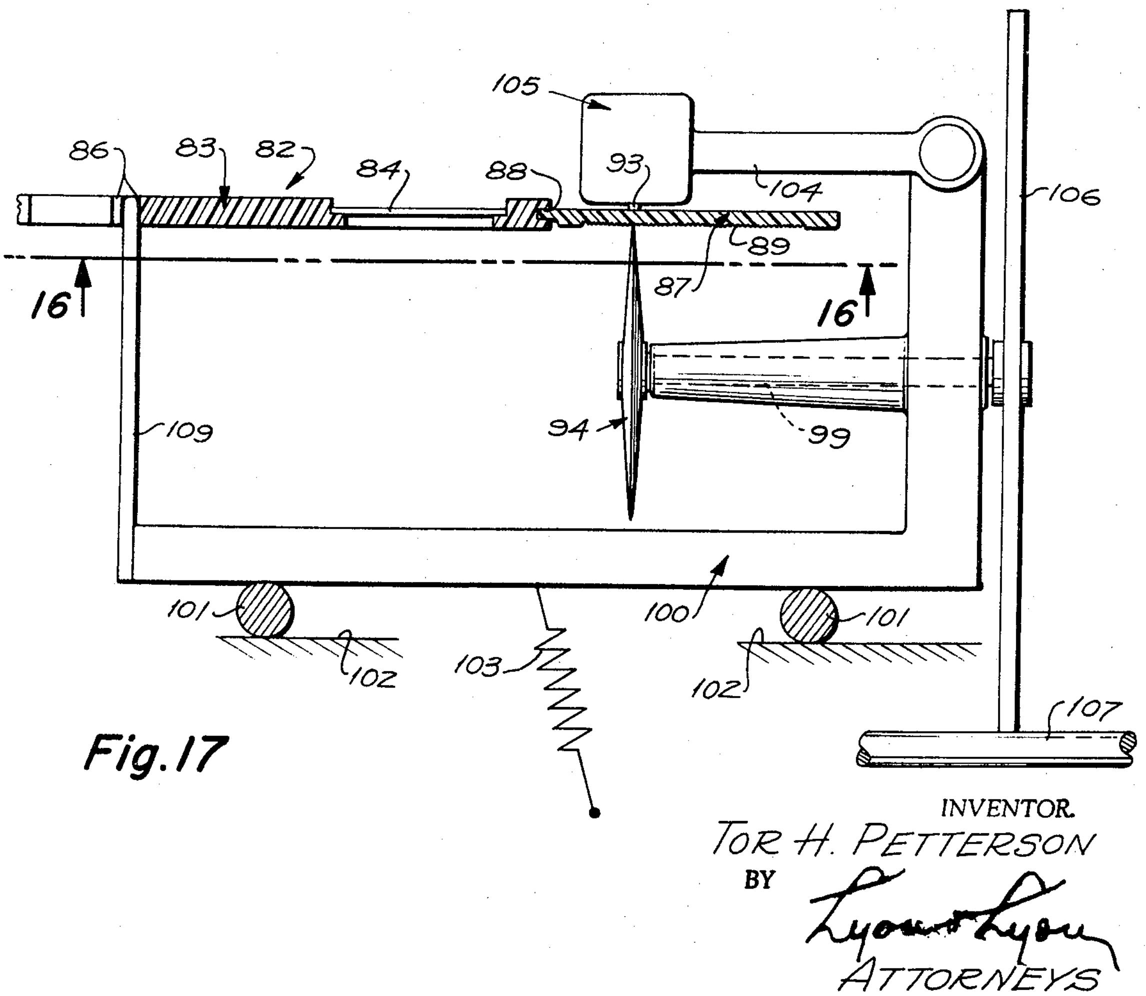
FIG. 17 is an enlarged fragmentary sectional view, taken through 17—17 of FIG. 16, showing the drive means for the audio visual cartridge, essentially diagrammatically.

Reference is now directed to FIGS. 16 through 20, and initially to FIGS. 16 and 17. The embodiment here illustrated includes an audio visual cartridge 82, having atransparency supporting disc 83, in which is fitted a ring of transparencies 84. Disposed in the central portion of the disc 83 is a spiral opening 85, having a set of stop shoulders 86, corresponding in number to the transparencies 84.

Surrounding the disc 83 is an audio disc 87, the inner margin of which is journaled in a retainer channel 88 formed in the periphery of the disc 83. One side of the audio disc is provided with a spiral drive groove 89, having tapered sides 90 and a rounded apex 91. The other side of the audio disc is provided with a magnetic spiral sound track 92, corresponding in pitch to the drive groove 89. The sound track cooperates with the magnetic pickup tip 93.

The drive groove 89 is engaged by a drive wheel 94, the margins of which have tapered sides 95, and terminate in a rounded periphery 96.

Figure 19:
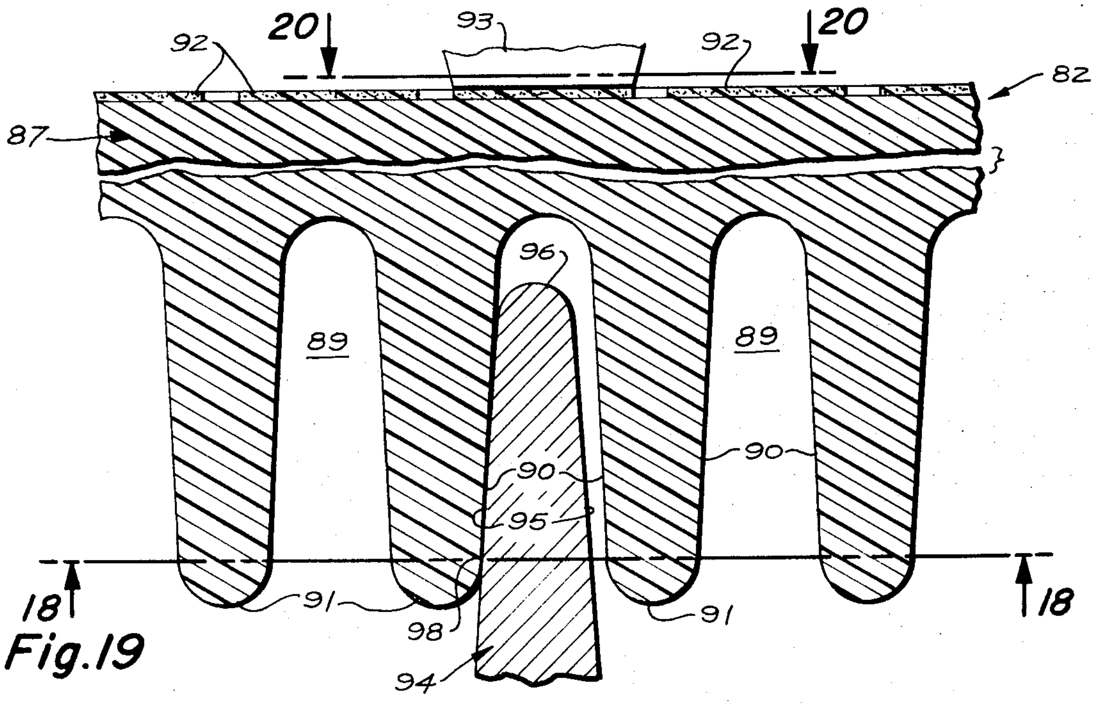
FIG. 19 is a greatly enlarged fragmentary sectional view of the audio disc and drive wheel, taken through 19—19 of FIG. 18.
Figure 20:
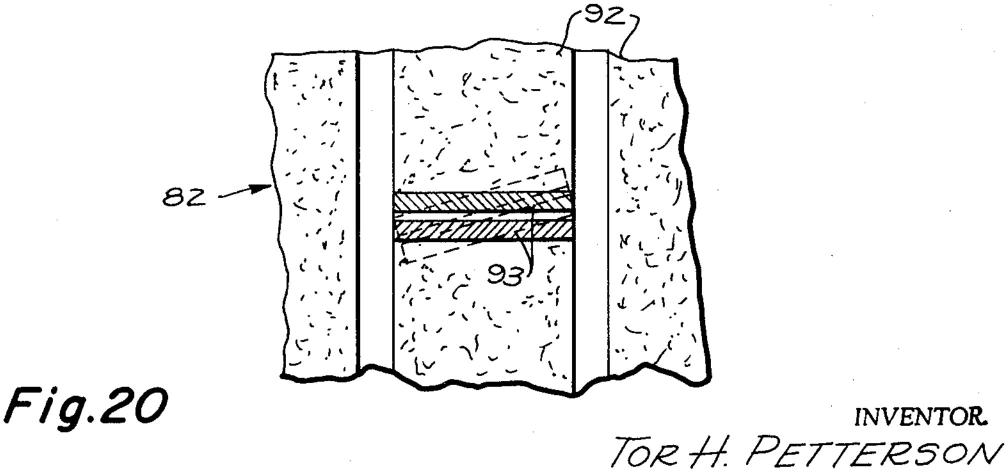
FIG. 20 is a greatly enlarged sectional view of the magnetic pickup head, taken through 20—20 of FIG. 29, with adjacent portions of the sound track shown fragmentarily.

The tapered sides 95 of the drive wheel have a slightly greater included angle than the tapered sides 90 of the drive groove 89, so that the contact plane of the drive groove 89 is adjacent the rounded apex 91. The contact plane defines a cord across the marginal portion of the drive wheel; that is, the plane 18-18 of FIG. 19, which is shown in IFG. 18. In this plane, the width of the drive wheel 94 is slightly less than the distance between the sides of the spiral groove so that the drive wheel contacts the groove at two peripheral bearing points 97, and a central bearing point 98. As a consequence, the drive wheel 94 is restrained against angular or azimuth displacement in a plane passing through its axis of rotation, which is in the plane corresponding to the plane in which FIG. 19 is taken.

Referring to FIG. 17, the drive wheel 94 is provided with a shaft 99, journaled on a carriage 100, shown substantially diagrammatically. To suggest a relatively friction-free mounting, the carriage is indicated as supported by rollers 101, which, in turn, ride on a fixed surface 102. The carriage may be held against the mounting rollers by a loading spring 103.

The carriage is provided with a pivotal arm 104, which supports a pickup head 105, having the pickup tip 93.

The shaft 99 may be rotated by a driven wheel 106, which engages a drive rod 107, analogous to the previously described drive means.

The carriage 100 is intended to move radially with respect to the audio visual cartridge 82, which may be supported on wheels or rollers 108, suggested in FIG. 16.

The transparency supporting disc 83 tends to rotate with the audio disc 87 when the audio disc is driven by the wheel 94. However, it is intended that the retainer channel 88 provide minimal friction so that the rotation of the disc 83 may be stopped without adding significant load to the driving connection between the wheel 94 and its groove 89. In order to provide intermittent movement of the transparency supporting disc 83, so that the transparencies 84 may be exposed in sequence to an optical system, not shown, the stop shoulders 86 are engaged in sequence by a stop finger 109. The stop finger is mounted on the carriage and moved radially inward as the drive wheel 94 follows the drive groove 89.

It is essential that the pickup tip 93 maintain a predetermined angular or azimuth relationship to the magnetic sound track. That is, should the pickup tip 93 move angularly with respect to the sound track, as indicated by dotted lines in FIG. 20, the quality of reproduction is seriously impaired. This movement is prevented by the three point contact, as indicated by the pair of peripheral points of contact 97 and the center point of contact 98, shown in FIG. 18.

Figure 18:
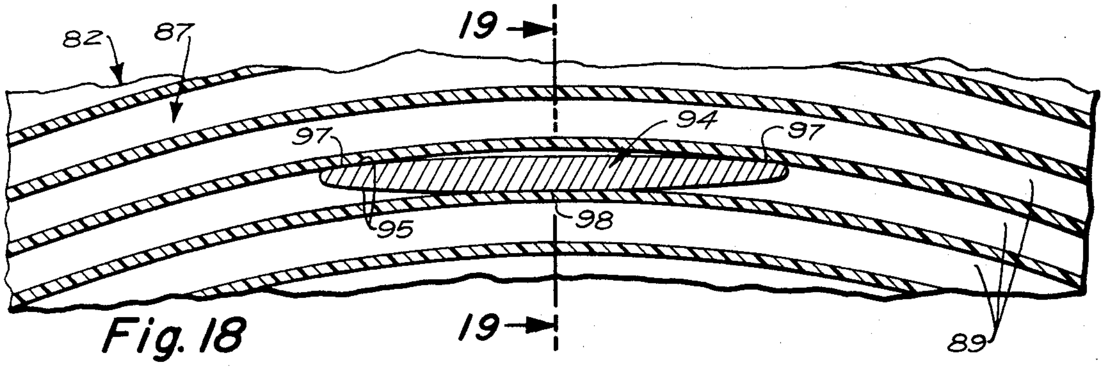
FIG. 18 is a greatly enlarged fragmentary sectional view of an embodiment of the audio disc, taken through 18—18 of FIG. 19, showing the drive track and drive wheel in the plane of their mutual engagement.

It should be noted that each of the previous embodiments may be modified to incorporate the three point contact arrangement as shown in FIG. 18.

While the opening 85 is shown in FIG. 16, the shoulders 86 may be formed by a series of slots, in which case the stop finger 109 may be moved into and out of the slots by a solenoid or other conventional means. Also, in this case, the audio visual cartridge 82 may be supported at its center in place of or in addition to the wheels 108.

While the supporing disc 83 is shown within the audio disc 87, it should be noted that the relationship of these discs may be reversed; that is, the audio disc may be mounted within the transparency supporting disc 83.

While particular embodiments of this invention have been shown and described, it is not intended to limit the same ot the details of the constructions set forth, but instead, the invention embraces such changes, modifications and equivalents of the various parts and their relationships as come within the purview of the appended claims.

I claim:

1. An audio reproducing disc for insertion in a drive mechanism including a drive wheel, means for rotating the drive wheel, a backup means confronting the drive wheel and an audio pickup means, the disc being insertable between the drive wheel and backup means, and for rotation, and comprising:

a. a spiral audio track on the disc for cooperation with the audio pickup means;
b. and a spiral drive groove formed in the disc corresponding in pitch to the spiral audio track;
c. the drive groove dimensioned to receive the marginal portion of the drive wheel for contact therewith at three spaced points including a first point at the radially inner side of the groove engaging one side of the drive wheel, and a pair of points at the radially outer side of the groove spaced circumferentailly from the first point and engaging the other side of the drive wheel thereby to restrain the disc against angular displacement relative to the rotational axis of the drive wheel, and also to restrain the audio track against corresponding angular displacement.

2. A disc, as defined in claim 1, including:

a. means for carrying a transparency in essentially coplanar relation to the audio reproducing disc, and permitting rotation of the disc relative to the transparency.

3. A disc, as defined in claim 2, wherein:

a. the transparency carrying means includes guide means to permit translatory movement of the audio reproducing disc as well as rotational movement thereof relative to the transparency carrying means.

4. An audio reproducing apparatus, comprising:
a. an audio reproducing disc having a spiral audio track on one side and a corresponding spiral drive groove on the opposite side;
b. an audio pickup means cooperating with the audio track;
c. a drive wheel having a tapered margin received in the drive groove;
d. a shaft for the drive wheel disposed in radial relation to the disc;
e. carrier means for supporting the shaft and the pickup means for radial movement in unison with respect to the disc;
f. the drive groove having side walls of lesser taper than the margin of the drive wheel, and proportioned with respect to the drive wheel to contact the drive wheel on opposite sides thereof and at three spaced points to restrain the drive wheel and the pickup means against angular movement with respect to the axis of the drive wheel shaft.

5. An apparatus as described in claim 4, including:
a visual reproducing transparency;
b. a mounting means disposing the transparency in essentially coplanar relation with the audio reproducing disc;
c. and means for restraining the mounting means during rotation of the audio reproducing disc.

6. An apparagus as described in claim 4, including:
a. a visual reproducing transparency;
b. a mounting means for securing the transparency against movement, the mounting means also supporting the audio reproducing disc to permit both rotational and translatory movement relative to the transparency;
c. said drive wheel, on rotating the disc, causing a corresponding translatory movement thereof.

7. An apparatus as described in claim 4, including:
a. a ring of visual reproducing transparencies;
b. a mounting means frictionally connected with the sound reproducing disc for rotation therewith, the mounting means including a spiral set of stops corresponding to the transparencies;
c. and means radially movable with the carrier means to engage the stops in sequence thereby to restrain the transparencies for sequential viewing.

8. An audio reproducing apparatus, comprising:
a. an audio reproducing disc having an arcuate audio track and a corresponding arcuate drive groove therein;
b. an audio pickup means cooperating with the audio track;
c. a drive wheel, when in operation, being in fixed relation to the audio pickup means and having a margin received in the drive groove;
d. means for rotating the drive wheel to cause movement of the drive groove past the drive wheel;
e. the drive groove and drive wheel being relatively proportioned whereby the drive groove contacts the drive wheel at a central point at one side thereof and at two arcuately spaced points at the opposite side thereof, thereby to maintain said audio track and audio pickup means in fixed position.

* * * * *